(12) United States Patent
Kim et al.

(10) Patent No.: US 8,946,953 B2
(45) Date of Patent: Feb. 3, 2015

(54) BASE ASSEMBLY FOR MOTOR AND SPINDLE MOTOR INCLUDING THE SAME

(75) Inventors: Dong Jin Kim, Gyunggi-do (KR);
Young Ha Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 351 days.

(21) Appl. No.: 13/357,174

(22) Filed: Jan. 24, 2012

(65) Prior Publication Data
US 2013/0113321 A1    May 9, 2013

(30) Foreign Application Priority Data

Nov. 4, 2011  (KR) .................. 10-2011-0114591

(51) Int. Cl.
*H02K 7/00* (2006.01)
*G11B 19/20* (2006.01)
*H02K 5/167* (2006.01)
*F16C 17/10* (2006.01)
*F16C 25/04* (2006.01)
*F16C 41/00* (2006.01)

(52) U.S. Cl.
CPC .......... *G11B 19/2009* (2013.01); *H02K 5/1675* (2013.01); *F16C 17/107* (2013.01); *F16C 25/045* (2013.01); *F16C 41/008* (2013.01); *H02K 2205/03* (2013.01)
USPC ....... 310/67 R; 310/51; 360/98.07; 360/99.08

(58) Field of Classification Search
None
See application file for complete search history.

(56) References Cited

U.S. PATENT DOCUMENTS

| | | | |
|---|---|---|---|
| 6,483,209 B1* | 11/2002 | Horng et al. ..................... | 310/51 |
| 7,830,049 B2* | 11/2010 | Yoneda et al. .................. | 310/51 |
| 2009/0174272 A1 | 7/2009 | Yoneda et al. | |
| 2010/0142359 A1* | 6/2010 | Sakata et al. ............... | 369/270.1 |
| 2011/0069416 A1* | 3/2011 | Kang ............................ | 360/274 |
| 2011/0134566 A1* | 6/2011 | Sekii et al. .................. | 360/99.08 |

FOREIGN PATENT DOCUMENTS

| | | |
|---|---|---|
| JP | 2009-5561 | 1/2009 |
| JP | 2010-81708 | 4/2010 |
| JP | 2010-136575 | 6/2010 |
| KR | 10-2011-0032288 | 3/2011 |

OTHER PUBLICATIONS

Korean Office Action issued Sep. 25, 2012 in corresponding Korean Patent Application No. 10-2011-0114591.

* cited by examiner

*Primary Examiner* — Tran Nguyen (57) ABSTRACT

There is provided a base assembly for a motor, the base assembly including: a base supporting rotation of a rotating member of the motor; and a pulling plate provided to the base to thereby prevent excessive floating of the rotating member, wherein the pulling plate includes a body part not in contact with the base and an extension part extended from the body part to thereby contact the base.

7 Claims, 7 Drawing Sheets

FIG. 9B

BASE ASSEMBLY FOR MOTOR AND SPINDLE MOTOR INCLUDING THE SAME

CROSS-REFERENCE TO RELATED APPLICATIONS

This application claims the priority of Korean Patent Application No. 10-2011-0114591 filed on Nov. 4, 2011, in the Korean Intellectual, Property Office, the disclosure of which is incorporated herein by reference.

BACKGROUND OF THE INVENTION

1. Field of the Invention

The present invention relates to a bearing assembly for a motor and a spindle motor including the same, and more particularly, to a flexible circuit board for a motor capable of being used in a hard disk drive (HDD) rotating a recording disk, and a spindle motor including the same.

2. Description of the Related Art

A hard disk drive (HDD), an information storage device, reads data stored on a disk or writes data to the disk using a magnetic head.

In a hard disk drive, a base has a head driver installed thereon, that is, a head stack assembly (HSA), capable of altering a position of the magnetic head relative to the disk. The magnetic head performs its function while moving to a desired position in a state in which it is suspended above a writing surface of the disk by the head driver at a predetermined height.

In addition, the hard disk drive requires a disk driving device capable of driving the disk. In the disk driving device, a small-sized spindle motor is used.

The small-sized spindle motor includes a rotating member and a fixed member, has a structure in which the rotating member rotates around the fixed member, and requires a predetermined floating force for the rotation thereof.

However, in the case in which a level of force greater than the amount of floating force required for the rotation of the rotating member occurs, that is, in the case in which excessive floating occurs, the rotating member does not normally rotate or is separated from the fixed member, thereby causing performance thereof to be significantly deteriorated.

In order to solve this defect, a pulling plate having attraction force acting between the pulling plate and a magnet mounted in the motor is coupled to the base, thereby preventing the rotating member from being excessively floated. However, the pulling plate according to the related art has weak coupling force with regard to the base, such that it may be separated from the base even in the case in which a small external impact is applied thereto.

Therefore, research into a technology for significantly increasing the performance and lifespan of a spindle motor by improving coupling force between a pulling plate preventing excessive floating of a rotating member and a base is urgently required.

SUMMARY OF THE INVENTION

An aspect of the present invention provides a base assembly for a motor capable of improving the performance and lifespan of a spindle motor by significantly increasing coupling force between a pulling plate preventing excessive floating of a rotating member and a base, and a spindle motor including the same.

According to an aspect of the present invention, there is provided a base assembly for a motor, the base assembly including: a base supporting rotation of a rotating member of the motor; and a pulling plate provided to the base to thereby prevent excessive floating of the rotating member, wherein the pulling plate includes a body part not in contact with the base and an extension part extended from the body part to thereby contact the base.

The base may be provided with an insertion part into which the extension part is inserted to be mounted.

At least one of the pulling plate and the insertion part may be continuously formed in a circumferential direction.

The extension part may contact a bottom surface of the insertion part.

The extension part may contact at least one side surface of the insertion part.

The body part may be extended from an end portion of the extension part in at least one of inner diameter and outer diameter directions.

The insertion part and the extension part not in contact with the insertion part may have an adhesive filled therebetween.

The base may include a non-contact formation part, formed by depressing one surface of the base corresponding to the body part downwardly in an axial direction.

The base and the body part may have an adhesive filled therebetween.

According to another aspect of the present invention, there is provided a spindle motor including: the base assembly for a motor of any one of claims 1 to 9; a core included in the base and having a coil wound therearound, the coil generating rotational driving force; and a sleeve included in the base and supporting rotation of a shaft together with a hub.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 1:
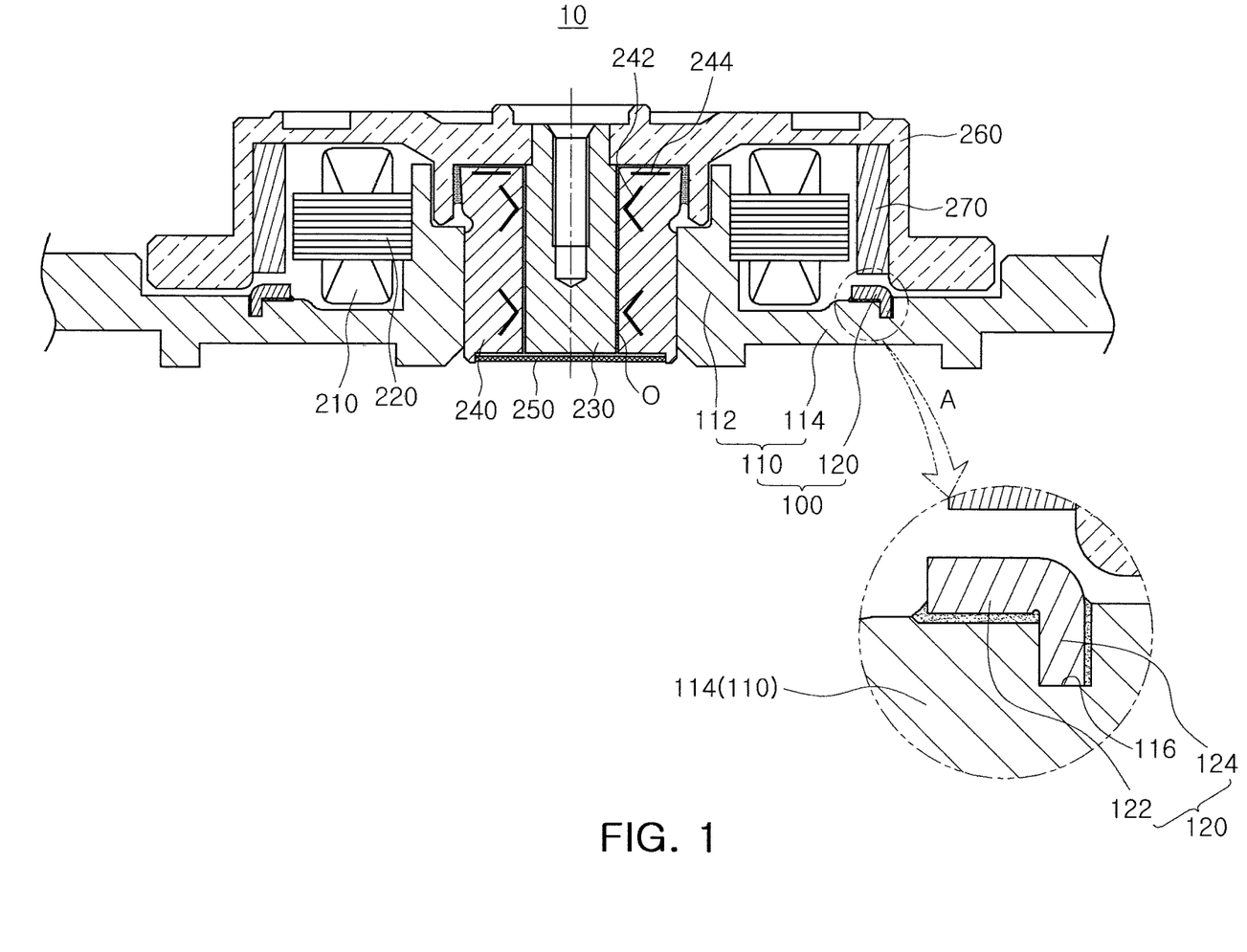
FIG. 1 is a schematic cross-sectional view showing a spindle motor including a base assembly for a motor according to an embodiment of the present invention.

FIG. 1 is a schematic cross-sectional view showing a spindle motor including a base assembly for a motor according to an embodiment of the present invention.

Referring to FIG. 1, a spindle motor 10 including a base assembly 100 for a motor according to an embodiment of the present invention may include the base assembly 100 including a base 110 and a pulling plate 120, a core 220 having a coil 210 wound therearound, and a sleeve 240 supporting rotation of a shaft 230 in conjunction with a hub 260.

The base assembly 100 for a motor may include the base 110 and the pulling plate 120 and refer to a fixed member together with the sleeve 240 in the spindle motor 10 according to the embodiment of the present invention.

More specifically, the base 110 may support rotation of a rotating member including the hub 260 and include the coil 210 and the core 220 coupled thereto. Here, the coil 210 generates electromagnetic force having a predetermined magnitude at the time of the application of power and the core 220 has the coil 210 wound therearound.

In other words, the base 110 may include a protrusion part 112 and a body part 114, the protrusion part 112 having an inner peripheral surface coupled to an outer peripheral surface of the sleeve 240 supporting the shaft 230 to thereby support the sleeve 240.

That is, the protrusion part 112 may have a hollow and protrude upwardly in an axial direction. Here, the hollow may have the sleeve 240 inserted thereinto and coupled thereto by a method such as welding, bonding, press-fitting, or the like, and the sleeve 240 supports the shaft 230.

In addition, the protrusion part 112 may have the core 220 coupled to an outer peripheral surface thereof, the core 220 having the coil 210 wound therearound. Rigidity of the protrusion part 112 needs to be secured in order to secure rotation stability of the spindle motor 10 according to the embodiment of the present invention.

Here, the body part 114 configuring the base 110 may be extended from the protrusion part 112 in an outer diameter direction and form an internal space of the base 110.

Here, the internal space may be a space in which the core 220 having the coil 210 wound therearound and the hub 260 are disposed.

In addition, the body part 114 of the base 110 may be provided with an insertion part 116 so as to mount the pulling plate 120 therein. Here, the insertion part 116 may be continuously formed in a circumferential direction.

Here, a coupling relationship between the insertion part 116 and the pulling plate 120 will be described below in detail with reference to FIGS. 2 through 5.

The pulling plate 120 may have magnetic attraction force acting between the pulling plate 120 and a magnet 270 coupled to the hub 260, and may prevent the rotating member including the shaft 230 and the hub 260 from being excessively floated.

The shaft 230 and the hub 260, components of the rotating member of the spindle motor 10 according to the embodiment of the present invention, need to be floated at a predetermined height so as to be stably rotated. However, in the case in which the shaft 230 and the hub 260 are floated at a height higher than a pre-designed floating height, it may have a negative effect on performance.

In this case, in order to prevent the excessive floating of the shaft 230 and the hub 260, components of the rotating member, the pulling plate 120 may be mounted in the insertion part 116 formed in the base 110. Therefore, the excessive floating of the rotating member may be prevented by the magnetic attraction force acting between the pulling plate 120 and the magnet 270.

Here, the pulling plate 120 may include a body part 122 and an extension part 124.

Meanwhile, a detailed configuration of the pulling plate 120 and a coupling relationship between the pulling plate 120 and the insertion part 116 of the base 110 will be described below in detail with reference to FIGS. 2 through 5.

The shaft 230, a component of the rotating member coupled to hub 260 to thereby rotate together with the hub 260, may be supported by the sleeve 240.

Meanwhile, the hub 260, a rotating structure rotatably provided with respect to the fixed member including the base 110, includes an annular ring-shaped magnet 270 provided on an inner peripheral surface thereof. Here, the annular ring-shaped magnet 270 corresponds to the core 220 while having a predetermined gap therebetween, and the core 220 includes the coil 210 wound therearound.

Here, the magnet 270 may interact electromagnetically with the coil 210 wound around the core 220 to thereby generate rotational driving force of the spindle motor 10, according to the embodiment of the present invention.

In addition, the sleeve 240 may support the shaft 230, a component of the rotating member. The sleeve 240 may support the shaft 230 such that an upper end of the shaft 230 protrudes upwardly in the axial direction and may be formed by forging Cu or Al or sintering a Cu—Fe based alloy powder or a SUS based power.

In addition, the sleeve 240 may include a shaft hole having the shaft 230 inserted thereinto such that the sleeve 240 and the shaft 230 have a micro clearance therebetween, and the micro clearance may be filled with oil O to thereby stably support the shaft 230 by radial dynamic pressure via the oil O.

Here, the radial dynamic pressure via the oil O may be generated by a fluid dynamic pressure part 242 formed as a groove in an inner peripheral surface of the sleeve 240. The fluid dynamic pressure part 242 may have one of a herringbone shape, a spiral shape, and a screw shape.

However, the fluid dynamic pressure part 242 is not limited to being formed in the inner peripheral surface of the sleeve 240 as described above but may also be formed in an outer peripheral surface of the shaft 230, a component of the rotating member. In addition, the number of fluid dynamic pressure parts 242 is also not limited.

In addition, the sleeve 240 may include a thrust dynamic pressure part 244 formed in an upper surface thereof so as to generate thrust dynamic pressure via the oil O. The rotating member including the shaft 230 may rotate in a state in which a predetermined floating force is secured by the thrust dynamic pressure part 244.

Here, the thrust dynamic pressure part 244 may be a groove having a herringbone shape, a spiral shape, or a screw shape, similar to that of the fluid dynamic pressure part 242. However, the thrust dynamic pressure part 224 is not necessarily limited to having the above-mentioned shapes but may have any shape as long as thrust dynamic pressure may be provided thereby.

In addition, the thrust dynamic pressure part 244 is not limited to being formed in the upper surface of the sleeve 240 but may also be formed in one surface of the hub 260 corresponding to the upper surface of the sleeve 240.

Further, the sleeve 240 may include a base cover 250 coupled to a lower portion thereof so as to close the lower portion thereof. The spindle motor 10 according to the embodiment of the present invention may be formed to have a full-fill structure by the base cover 250.

Figure 2:
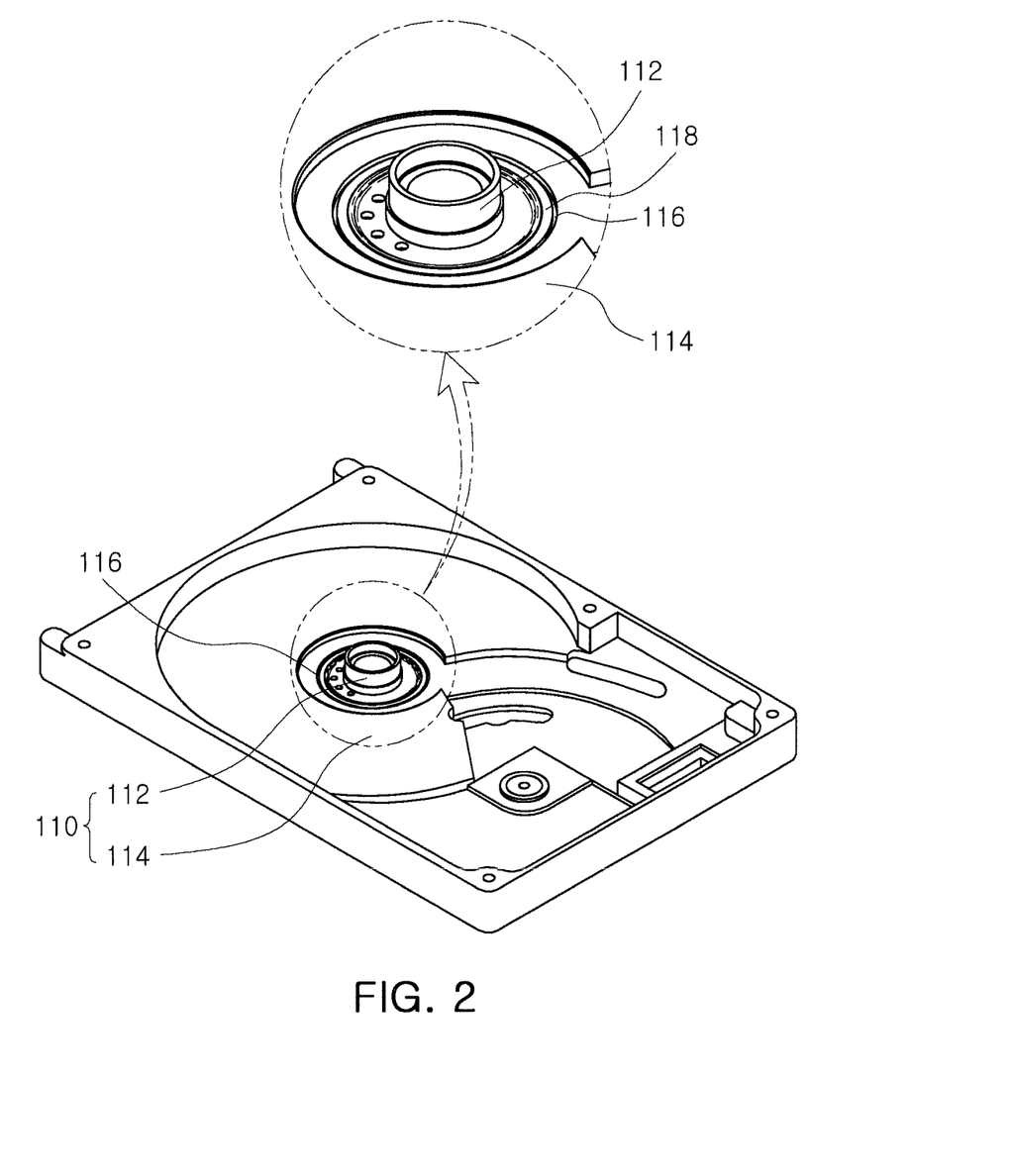
FIG. 2 is a schematic perspective view showing a base provided in the base assembly for a motor according to the embodiment of the present invention.
Figure 3:
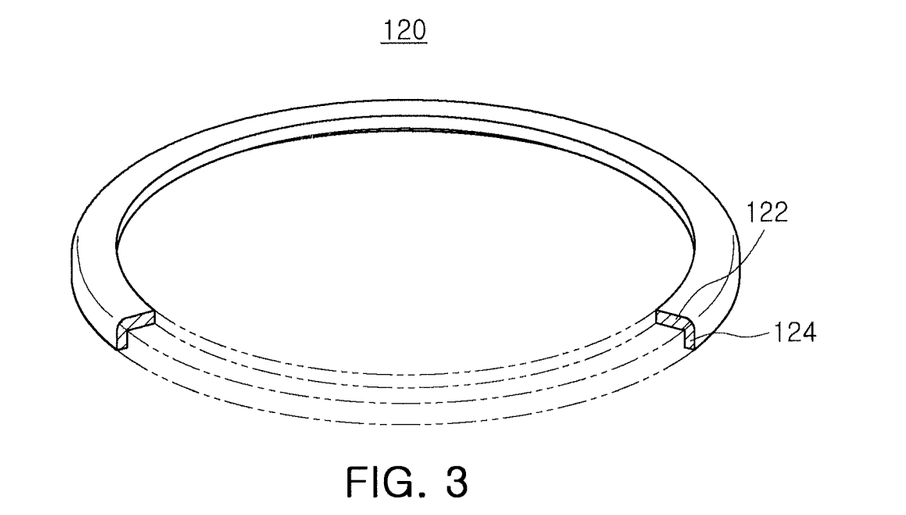
FIG. 3 is a schematic perspective view showing a pulling plate provided in the base assembly for a motor according to the embodiment of the present invention.
Figure 4A:
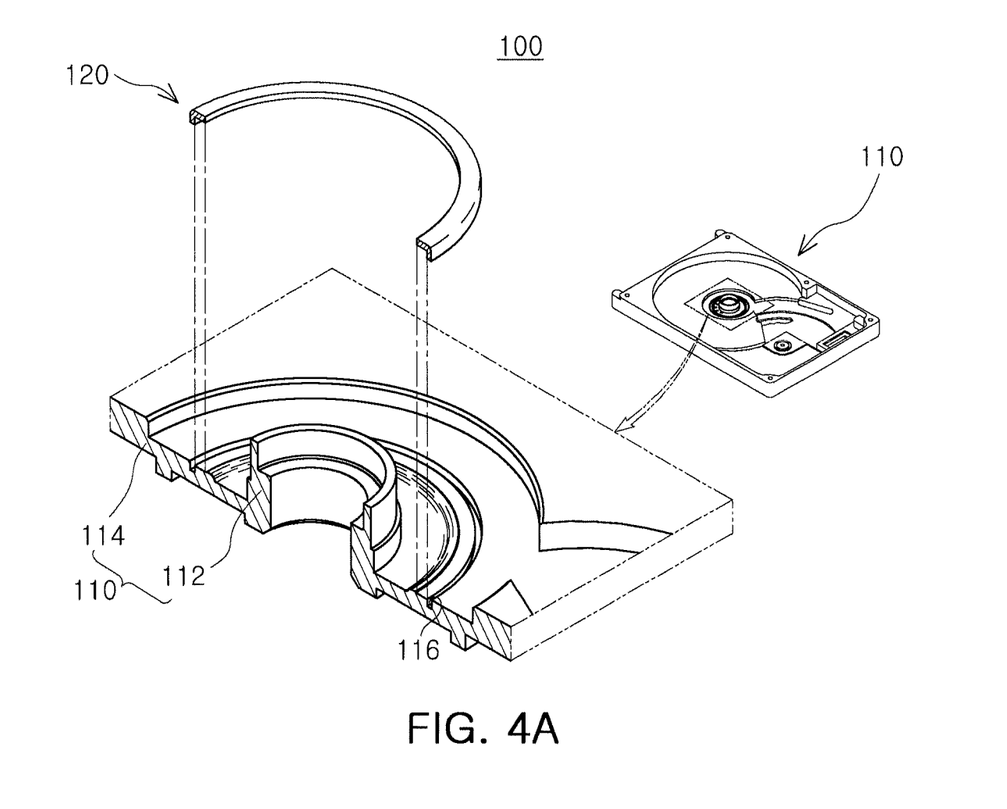
FIGS. 4A and 4B are schematic cut-away perspective views showing a combining process of the base assembly for a motor according to the embodiment of the present invention.
Figure 4B:
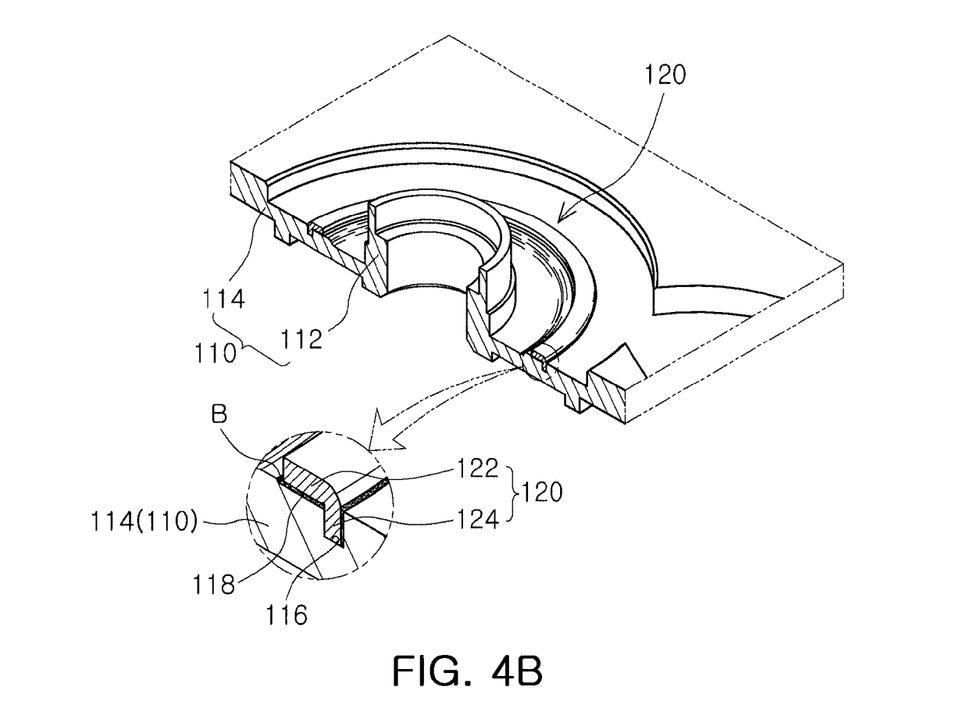

FIG. 2 is a schematic perspective view showing a base included in the base assembly for a motor according to the embodiment of the present invention. FIG. 3 is a schematic perspective view showing a pulling plate provided in the base assembly for a motor according to the embodiment of the present invention. FIGS. 4A and 4B are schematic cut-away perspective views showing a combining process of the base assembly for a motor according to the embodiment of the present invention.

Referring to FIGS. 2 through 4B, the base 110 provided in the base assembly 100 for a motor according to the embodiment of the present invention may include the protrusion part 112 and the body part 114.

A predetermined region of the body part 114, that is, one surface of the body part 114 corresponding to the magnet 270 coupled to the hub 260 may be provided with the insertion part 116 into which the pulling plate 120 is inserted to be mounted.

Meanwhile, the insertion part 116 may be continuously formed so as to correspond to the magnet 270 and have a bottom surface contacting the pulling plate 120.

Here, a detailed configuration of the pulling plate 120 will be described. The pulling plate 120 may include the body part 122 and the extension part 124 extended downwardly from an end portion of the body part 122 in the axial direction.

In other words, the body part 122 may be extended from an end portion of the extension part 124 in an inner diameter direction.

In addition, the pulling plate 120 may have an annular ring shape which is continuously formed in the circumferential direction and be formed of a ferromagnetic material (iron (Fe), nickel (Ni), cobalt (Co), an alloy thereof, or the like) that may be magnetized by the magnet 270.

More specifically, the body part 122 of the pulling plate 120 may not contact the base 110; however, the extension part 124 thereof may contact the base 110.

Here, the base 110 may include a non-contact formation part 118 formed by depressing one surface thereof corresponding to the body part 122 downwardly in the axial direction so as not to contact the body part 112.

However, the non-contact formation part 118 is not a necessary component and may be replaced by controlling a length of the extension part 124 in the axial direction in order to prevent a contact between the body part 122 and the base 110.

Meanwhile, the body part 122 of the pulling plate 120 may be disposed on an upper surface of the base 110, and the extension part 124 thereof may be inserted into an internal space of the insertion part 116.

Here, a lower surface of the extension part 124 may contact the bottom surface of the insertion part 116.

In addition, an inner side surface of the extension part 124 may contact an inner side surface of the insertion part 116, and an outer side surface of the extension part 124 may not contact an outer side, surface of the insertion part 116.

That is, the inner side surface of the extension part 124 has a diameter slightly smaller than that of the inner side surface of the insertion part 116, such that the inner side surface of the extension part 124 may contact the inner side surface of the insertion part 116 by press-fitting the pulling plate 120 into the insertion part 116 by external force.

Here, an adhesive B may be filled between the insertion part 116 and the extension part 124 not in contact with the insertion part 116 and between the body part 122 and the base 110 in order to increase coupling force between the pulling plate 120 and the base 110.

Therefore, by the press-fitting, the extension part 124 of the pulling plate 120 and the bottom surface of the insertion part 116 are in contact with each other and the inner side surface of the extension part 124 and the inner side surface of the insertion part 116 are in contact with each other. A portion in which the pulling plate 120 and the base 120 are not in contact with each other is filled with the adhesive B, whereby an amount of the adhesive may be significantly reduced.

Therefore, since the amount of the adhesive B may be significantly reduced, the spindle motor 10 according to the embodiment of the present invention may significantly increase the coupling force between the pulling plate 120 and the base 110 simultaneously with significantly reducing contamination due to adhesive foreign materials.

However, a press-fitting process and the adhesive need not to be simultaneously applied in coupling the pulling plate 120 to the base 110. That is, the pulling plate 120 may be coupled to the base 110 only by the press-fitting process.

Therefore, an assembling process between the pulling plate 120 and the base 110 is simplified, whereby productivity may be significantly increased.

Additionally, each of the inner and outer side surfaces of the extension part may not also contact each of the inner and outer side surfaces of the insertion part 116.

Figure 5:
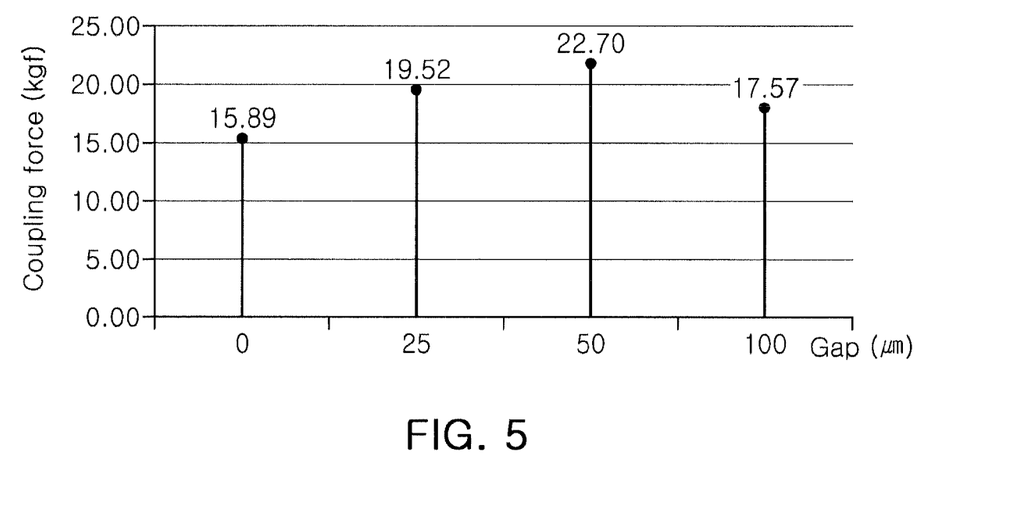
FIG. 5 is a graph showing measurement results of a magnitude of coupling force between the pulling plate and the base provided in the base assembly for a motor according to the embodiment of the present invention, based on a gap therebetween.

FIG. 5 is a graph showing measurement results of a magnitude of coupling force between the pulling plate and the base provided in the base assembly for a motor according to the embodiment of the present invention, based on a gap therebetween.

In FIG. 5, a horizontal axis means a gap between the base 110 and the body part 122 of the pulling plate 120, and a vertical axis means a magnitude of coupling force between the base 110 and the pulling plate 120 according to the gap.

Meanwhile, FIG. 5 is a graph showing experimental results on the assumption that the adhesive B is filled in the gap between the base 110 and the body part 122 of the pulling plate 120 and filled between the insertion part 116 and the extension part 124 not in contact with the insertion part 116.

As shown in FIG. 5, in the case in which the gap was not present between the base 110 and the body part 122 of the pulling plate 120, a magnitude of the coupling force was 15.89 kgf, and in the case in which the gap was 25 μm, a magnitude of the coupling force was 19.52 kgf.

In addition, in the case in which the gap was 50 μm, a magnitude of the coupling force was 22.70 kgf, and in the case in which the gap was 100 μm, a magnitude of the coupling force was 17.57 kgf.

Therefore, it could be appreciated that the coupling force between the base 110 and the pulling plate 120 is improved in the case in which the base 110 and the body part 122 of the pulling plate 120 are not in contact with each other as compared to the case in which they are in contact with each other.

Therefore, in the case in which the base 110 and the body part 122 of the pulling plate 120 are not in contact with each other, the possibility that the pulling plate 120 will be separated from the base 110 due to external impacts may be significantly reduced.

Figure 6:
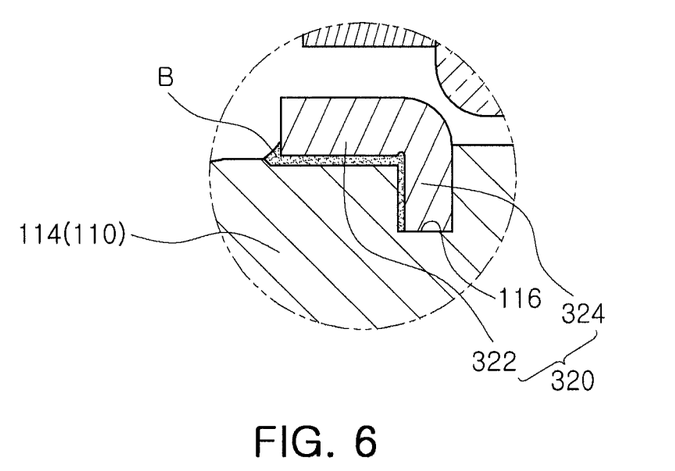
FIG. 6 is a schematic enlarged cross-sectional view showing a modified example of part A of FIG. 1.

FIG. 6 is a schematic enlarged cross-sectional view showing a modified example of part A of FIG. 1.

Referring to FIG. 6, a lower surface of an extension part 324 of a pulling plate 320 may contact the bottom surface of the insertion part 116 of the base 110.

In addition, an outer side surface of the extension part 324 may contact an outer side surface of the insertion part 116, and an inner side surface of the extension part 324 may not contact an inner side surface of the insertion part 116.

That is, the outer side surface of the extension part 324 has a diameter slightly larger than that of the outer side surface of the insertion part 116, such that the outer side surface of the extension part 324 may contact the outer side surface of the insertion part 116 by press-fitting the pulling plate 320 into the insertion part 116 by external force.

Here, an adhesive B may be filled between the insertion part 116 and the extension part 324 not in contact with the insertion part 116 and between the body part 322 and the base 110 in order to increase coupling force between the pulling plate 320 and the base 110.

Additionally, each of the outer and inner side surfaces of the extension part may not also contact each of the outer and inner side surfaces of the insertion part 116.

Figure 7A:
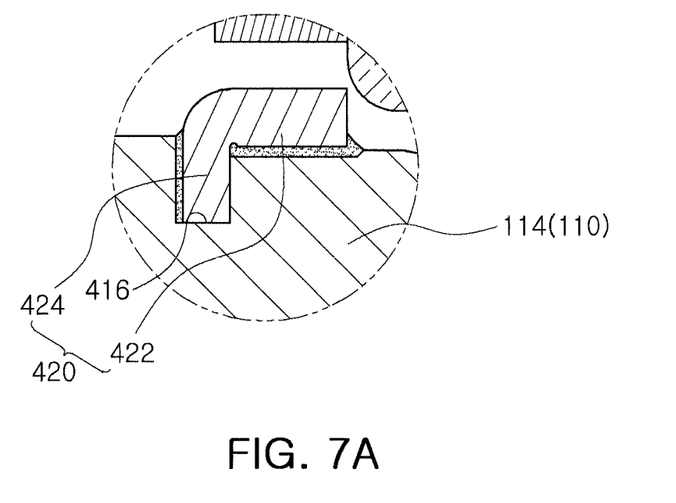
FIG. 7A is a schematic enlarged cross-sectional view showing another modified example of part A of FIG. 1.
Figure 7B:
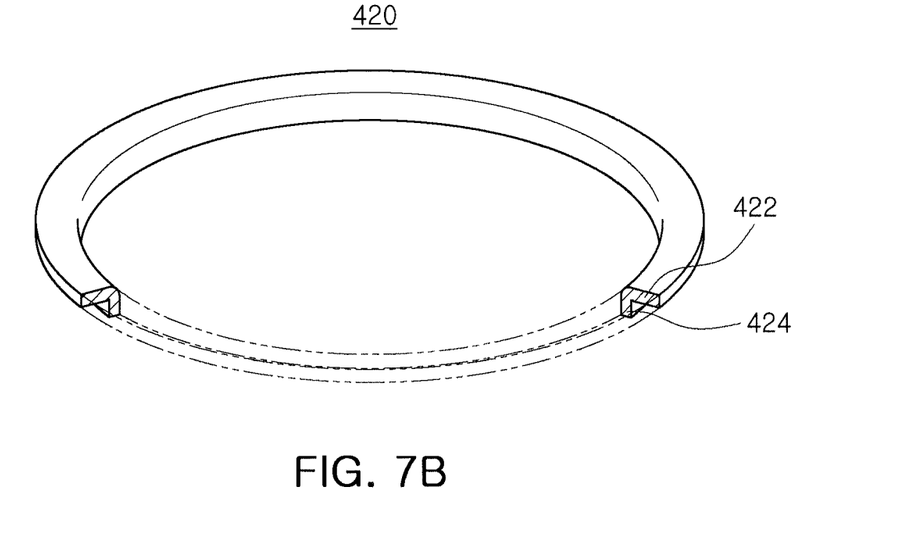
FIG. 7B is a schematic cut-away perspective view showing a pulling plate in accordance with FIG. 7A.

FIG. 7A is a schematic enlarged cross-sectional view showing another modified example of part A of FIG. 1. FIG. 7B is a schematic cut-away perspective view showing a pulling plate in accordance with FIG. 7A.

A pulling plate 420 shown in FIGS. 7A and 7B has the same configuration and effect at those of the pulling plate 320 described with reference to FIG. 6 with the exception of a direction in which the body part 322 of the pulling plate 320 is extended. Therefore, a description other than an extension direction of a body part 424 will be omitted.

The pulling plate 420 of FIGS. 7A and 7B may include the body part 422 and an extension part 424. Here, the body part 422 may be extended from an end portion of the extension part 424 in the outer diameter direction.

Here, in order to significantly increase magnetic attraction force between the pulling plate 420 and the magnet 270 coupled to the hub 260, the body part 422 needs to be disposed at a position corresponding to the magnet 270. Therefore, the insertion part 416 may be disposed inwardly of the insertion part 116 described with reference to FIG. 6 in the inner diameter direction.

Figure 8:
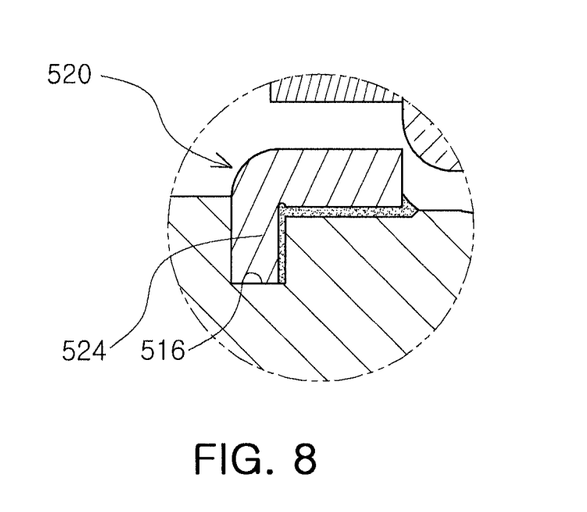
FIG. 8 is a schematic enlarged cross-sectional view showing another modified example of part A of FIG. 1.

FIG. 8 is a schematic enlarged cross-sectional view showing another modified example of part A of FIG. 1.

Referring to FIG. 8, the modified example of FIG. 8 is the same as the modified example of FIGS. 7A and 7B except that a portion in which an extension part 524 of a pulling plate 500 contacts an insertion part 516 is formed at a position opposite to that of the modified example of FIGS. 7A and 7B.

Figure 9A:
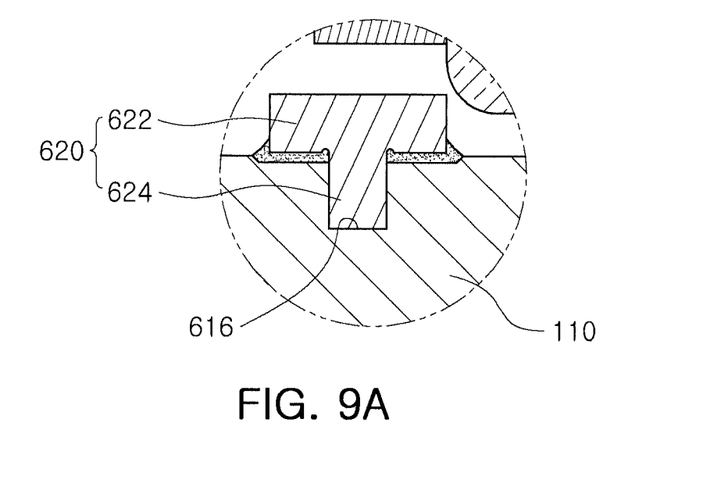
FIG. 9A is a schematic enlarged cross-sectional view showing another modified example of part A of FIG. 1.
Figure 9B:
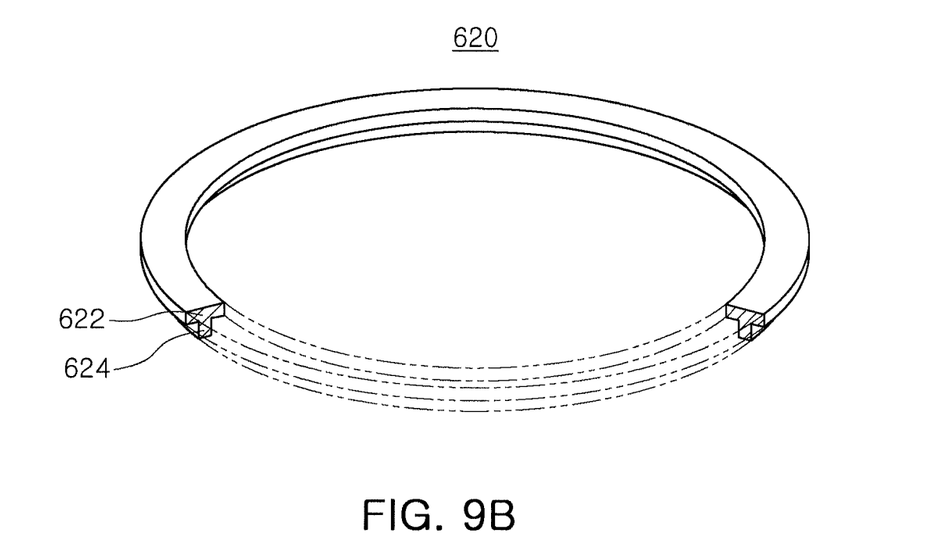
FIG. 9B is a schematic cut-away perspective view showing a pulling plate in accordance with FIG. 9A.

FIG. 9a is a schematic enlarged cross-sectional view showing another modified example of part A of FIG. 1. FIG. 9B is a schematic cut-away perspective view showing a pulling plate in accordance with FIG. 9A.

Referring to FIGS. 9A and 9B, a body part 622 of a pulling plate 600 may be formed from an end portion of an extension part 624 in the inner and outer diameter directions.

In addition, at least one of the body part 622 formed in the inner diameter direction based on the extension part 624 and the body part 622 formed, in the outer diameter direction based on the extension part 624 may not contact the base 110.

Meanwhile, an inner side surface and an outer side surface of the extension part 624 may contact an inner side surface and an outer side surface of the insertion part 616 by press-fitting. However, either of the inner side surface and the outer side surface of the extension part 624 may contact either of the inner side surface and the outer side surface of the insertion part 616.

As set forth above, with the bearing assembly for a motor and the spindle motor including the same according to the embodiments of the present invention, coupling force between the pulling plate and the base is improved, whereby the excessive floating of the rotating member can be prevented.

In addition, the amount of the adhesive required for coupling the pulling plate and the base to each other is significantly reduced, whereby a defect due to adhesive foreign materials can be significantly reduced.

Further, the assembling process between the pulling plate and the base is simplified, whereby productivity can be significantly increased.

While the present invention has been shown and described in connection with the embodiments, it will be apparent to those skilled in the art that modifications and variations can be made without departing from the spirit and scope of the invention as defined by the appended claims.

What is claimed is:

1. A base assembly for a motor, the base assembly comprising:
   a base supporting rotation of a rotating member of the motor and including an insertion part grooved in one surface thereof; and
   a pulling plate provided to the base to thereby prevent excessive floating of the rotating member,
   wherein the pulling plate includes a body part not in contact with the one surface of the base and an extension part extended from the body part, and the extension part is inserted into the insertion part such that a lower surface of the extension part is in contact with a bottom surface of the insertion part, and
   wherein the base and the body part have an adhesive filled therebetween.

2. The base assembly of claim 1, wherein at least one of the pulling plate and the insertion part is continuously formed in a circumferential direction.

3. The base assembly of claim 1, wherein the extension part contacts at least one side surface of the insertion part.

4. The base assembly of claim 1, wherein the body part is extended from an end portion of the extension part in at least one of inner diameter and outer diameter directions.

5. The base assembly of claim 1, wherein the extension part includes a non-contact portion not in contact with the insertion part, and the non-contact portion and the insertion part have an adhesive filled therebetween.

6. The base assembly of claim 1, wherein the base includes a non-contact formation part shaped to correspond to the body part, wherein the non-contact formation part is formed as a downwardly axial depressed portion in the one surface of the base.

7. A spindle motor comprising:
   the base assembly for a motor of claim 1;
   a core included in the base and having a coil wound therearound, the coil generating rotational driving force; and
   a sleeve included in the base and supporting rotation of a shaft together with a hub.

* * * * *